US008179387B2

(12) United States Patent
Shin et al.

(10) Patent No.: US 8,179,387 B2
(45) Date of Patent: May 15, 2012

(54) ELECTROPHORETIC DISPLAY AND DRIVING METHOD THEREOF

(75) Inventors: Sung Woo Shin, Chungcheongbuk-do (KR); Hui Eun Yang, Chungcheongbuk (KR)

(73) Assignee: LG Display Co., Ltd., Seoul (KR)

( * ) Notice: Subject to any disclaimer, the term of this patent is extended or adjusted under 35 U.S.C. 154(b) by 855 days.

(21) Appl. No.: 11/806,209

(22) Filed: May 30, 2007

(65) Prior Publication Data

US 2008/0143700 A1 Jun. 19, 2008

(30) Foreign Application Priority Data

Dec. 13, 2006 (KR) ........................ 10-2006-0127333

(51) Int. Cl.
*G06F 3/038* (2006.01)
*G09G 5/00* (2006.01)
*G09G 3/34* (2006.01)

(52) U.S. Cl. ......................... 345/208; 345/107; 345/214

(58) Field of Classification Search .................. 345/107, 345/208–210, 214–215
See application file for complete search history.

(56) References Cited

U.S. PATENT DOCUMENTS 7,012,600 B2 3/2006 Zehner et al.
7,119,772 B2 10/2006 Amundson et al.
2005/0001812 A1* 1/2005 Amundson et al. ........... 345/107
2006/0139311 A1* 6/2006 Zehner et al. ................. 345/107
2006/0202948 A1* 9/2006 Johnson et al. ............... 345/107

FOREIGN PATENT DOCUMENTS

WO WO 2005-034074 A1 4/2005

* cited by examiner

*Primary Examiner* — Alexander S Beck
*Assistant Examiner* — Charles V Hicks
(74) *Attorney, Agent, or Firm* — Morgan, Lewis & Bockius LLP

(57) ABSTRACT

A method of driving at least one cell of an electrophoretic display panel through a pixel electrode and a common electrode includes storing at least first data representative of an image currently displayed and second data representative of an image to be displayed; and applying a first AC data waveform and a first AC common waveform for initializing the at least one cell during a first number of frames, applying a second AC data waveform and a second AC common waveform for displaying the second data during a second number of frames, wherein the first number of frames depends on the first data and the second number of frames depends on the second data.

12 Claims, 9 Drawing Sheets

ELECTROPHORETIC DISPLAY AND DRIVING METHOD THEREOF

This application claims the benefit of the Korean Patent Application No. 10-2006-0127333 filed on Dec. 13, 2006, which is hereby incorporated by reference in its entirety.

BACKGROUND OF THE INVENTION

1. Field of the Invention

Embodiments of the present invention relate to a display device, and more particularly, to an electrophoretic display device. Embodiments of the present invention are suitable for a wide range of applications. In particular, embodiments are suitable for decreasing a drive voltage of the electrophoretic display device.

2. Description of the Related Art

If a material having an electric charge is placed in DC electric field, the material moves in accordance with electric charges, the size and shape of molecules and the like. Such a movement, i.e., a phenomenon in which materials are separated by the difference of movement, is named 'Electrophoresis.' Recently, a display device using electrophoresis has been developed. The interest in the electrophoresis display device stems from its potential use as a substitute for conventional paper medium.

FIG. 1 shows a schematic diagram of a circuit for generating a data voltage waveform in an electrophoretic display device in accordance with the related art. A similar related art display device has been disclosed in U.S. Pat. Nos. 7,012,600 and 7,119,772. Referring to FIG. 1, the related art electrophoretic display device compares the data entered in the current state with the data to be entered in the next state for each cell by use of a lookup table (LUT) 1, a plurality of memories 2 to 4 and a frame counter 5, as shown in FIG. 1, thereby determining the data V1 to Vn which are to be supplied to each cell for a plurality of frame periods, as a result.

The data V1 to Vn outputted from the lookup table 1 are digital data such as '00', '01', '10' and '11', and are changed to voltages of three states which are applied to a pixel electrode of each cell. '00' and '11' in the digital data is changed to 0V, '01' is changed to +15V, and '10' is changed to −15V.

FIG. 2 shows data voltage waveforms in the lookup table shown in FIG. 1 in accordance with the related art. In FIG. 2, 'W(11)' represents a peak white gray level, 'LG(10)' represents a bright intermediate gray level, 'DG(01)' represents a dark intermediate gray level, and 'B(00)' represents a peak black gray level. And, the number written under the drive waveform is the number of frames during which a particular waveform is applied.

A DC common voltage Vcom is supplied to a common electrode which is opposite to a pixel electrode. A positive data voltage supplied to the pixel electrode is a voltage which is higher than the DC common voltage Vcom, and a negative data voltage is a voltage which is lower than the DC common voltage Vcom.

A driving method of the electrophoretic display device has several problems: firstly, the storage capacity of a memory 4 increases because the digital data of each cell is 2 bits; moreover, the data voltage changed in accordance with the digital data are +15V and −15V which are comparatively high; furthermore, elements within a data drive integrated circuit (D-IC) should be configured as high voltage elements because of a high data voltage, thus the size of the D-IC should be that much larger and the cost thereof increases.

SUMMARY OF THE INVENTION

Accordingly, embodiments of the present invention are directed to an electrophoretic display device that is suitable for decreasing a drive voltage, and a driving method thereof.

An object of the present invention is the decrease a drive voltage of an electrophoretic display device.

Additional features and advantages of the invention will be set forth in the description of exemplary embodiments which follows, and in part will be apparent from the description of the exemplary embodiments, or may be learned by practice of the exemplary embodiments of the invention. These and other advantages of the invention will be realized and attained by the structure particularly pointed out in the written description of the exemplary embodiments and claims hereof as well as the appended drawings.

To achieve these and other advantages and in accordance with the purpose of the present invention, as embodied and broadly described, a display device includes an electrophoretic display panel including at least one cell displaying a first data; and a controller for changing a state of the at least one cell to display a second data, the controller responsive to the first and second data to apply an AC common waveform and an AC data waveform to the at least one cell during an initialization time and a entry time, wherein an initializing voltage of the AC common waveform and an initializing voltage of the AC data waveform are generated according to the first data during the initialization time, and an entry voltage of the AC common waveform and an entry voltage of the AC data waveform are generated according to the second data during the entry time.

In another aspect, a method of driving at least one cell of an electrophoretic display panel through a pixel electrode and a common electrode includes storing at least first data representative of an image currently displayed and second data representative of an image to be displayed; and applying a first AC data waveform and a first AC common waveform for initializing the at least one cell during a first number of frames, applying a second AC data waveform and a second AC common waveform for displaying the second data during a second number of frames, wherein the first number of frames depends on the first data and the second number of frames depends on the second data.

It is to be understood that both the foregoing general description and the following detailed description of the present invention are exemplary and explanatory and are intended to provide further explanation of the invention as claimed.

BRIEF DESCRIPTION OF THE DRAWINGS

These and other objects of the invention will be apparent from the following detailed description of the embodiments of the present invention with reference to the accompanying drawings, in which.

DETAILED DESCRIPTION OF THE EXEMPLARY EMBODIMENTS

Reference will now be made in detail to exemplary embodiments of the present invention, examples of which are illustrated in the accompanying drawings.

Figure 3:
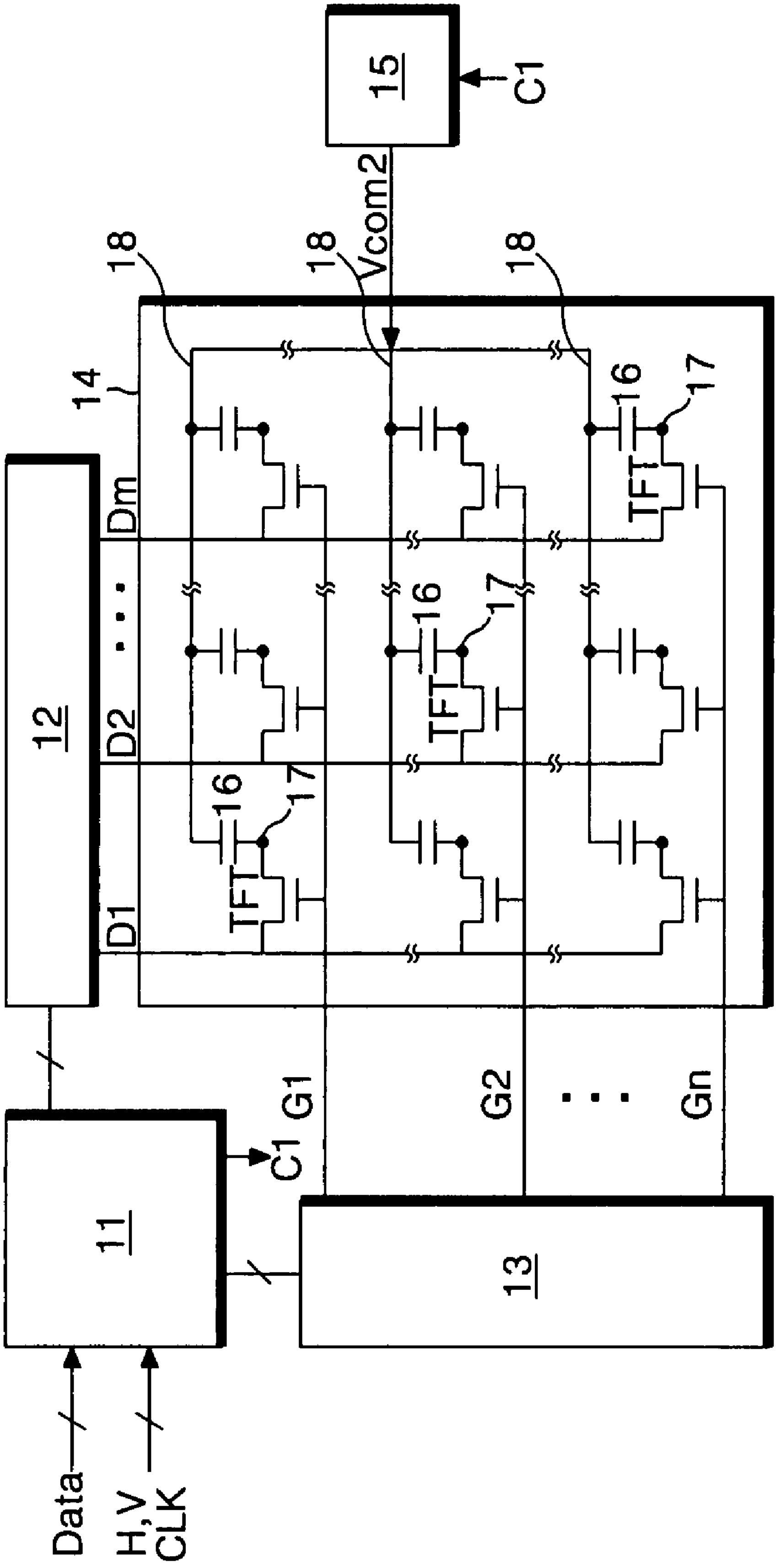
FIG. 3 shows a block diagram of an electrophoretic display device according to an embodiment of the present invention.

FIG. 3 shows a block diagram of an electrophoretic display device according to an embodiment of the present invention. Referring to FIG. 3, the electrophoretic display device according to the embodiment of the present invention includes a display panel 14 where m×n number of cells 16 are arranged; a data drive circuit 12 for supplying data voltages to data lines D1 to Dm of the display panel 14; a gate drive circuit 13 for supplying scan pulses to gate lines G1 to Gn of the display panel 14; a common voltage generation circuit 15 for supplying AC common voltages Vcom2 to a common electrode 18 of the display panel 14; and a timing controller 11 for controlling the data gate drive circuits 12, 13 and the common voltage generation circuit 15.

Figure 4:
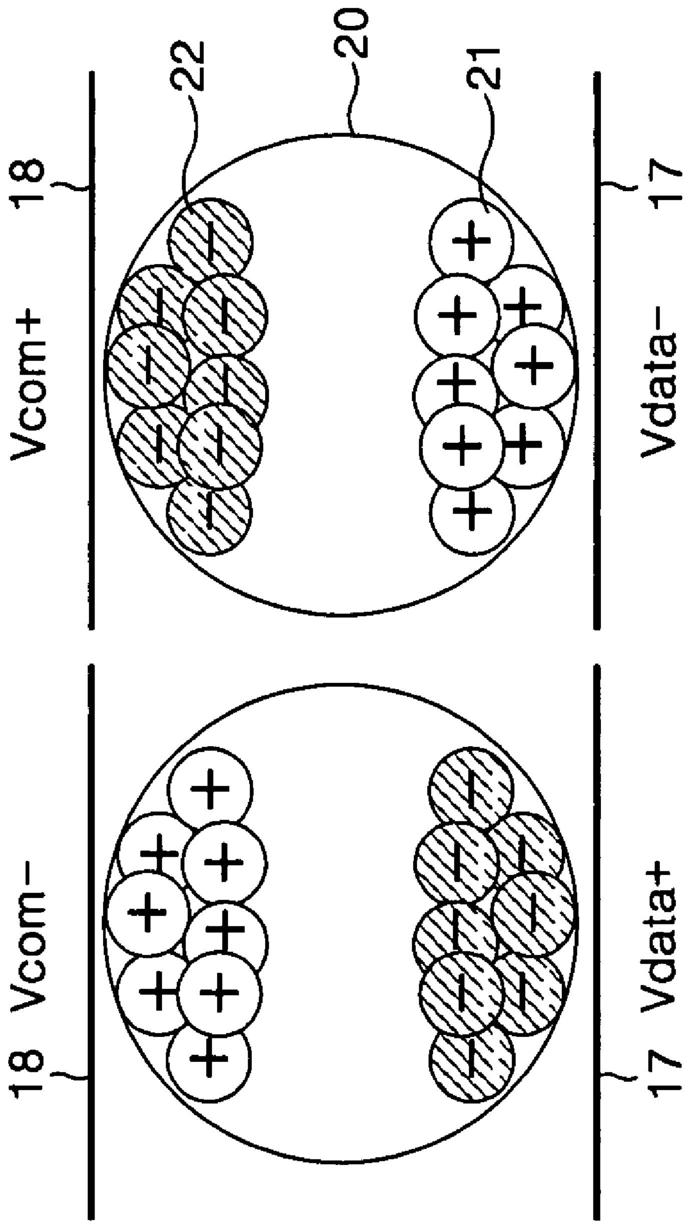
FIG. 4 shows a micro capsule structure of a cell in the electrophoretic display device of FIG. 3.

FIG. 4 shows a micro capsule structure of a cell in the electrophoretic display device of FIG. 3. Referring to FIG. 4, the display panel 14 has a plurality of micro capsules 20 formed between two substrates, as in FIG. 4. Each of the micro capsules 20 includes white particles 21 which are electrically charged to be positive and black particles 22 which are electrically charged to be negative. The m number of data lines D1 to Dm and the n number of gate lines G1 to Gn which are formed on a lower substrate of the display panel 14 are made to cross each other. TFT's are connected in intersections of the data lines D1 to Dm and the gate lines G1 to Gn. A source electrode of the TFT is connected to the data line D1 to Dm and a drain electrode thereof is connected to a pixel electrode 17. And, a gate electrode of the TFT is connected to the gate line G1 to Gn. The TFT is turned on in response to a scan pulse from the gate line G1 to Gn, thereby selecting cells 16 of one line which are intended to be displayed. A common electrode 18 is formed on an upper transparent substrate of the display panel 14 for simultaneously supplying the AC common voltage to all the cells.

On the other hand, the micro capsules 20 might include the negatively charged white particles and the positively charged black particles. In this case, the phase and voltage of the later-described drive waveform might be changed.

The data drive circuit 12 has a plurality of data drive integrated circuits of which each includes a shift register, a latch, a digital-analog converter, an output buffer and etc. The data drive circuit 12 latches the digital data under control of the timing controller 11, converts the digital data into a gamma compensation voltage to generate the data voltage, and then supplies the data voltage to the data lines D1 to Dm.

The gate drive circuit 13 has a plurality of gate drive integrated circuits of which each includes a shift register, a level shifter for converting a swing width of an output signal of the shift register into a swing width which is suitable for driving the TFT, and an output buffer being connected between the level shifter and the gate line G1 to Gn. The gate drive circuit 13 sequentially outputs the scan pulses synchronized with the data voltages supplied to the data lines D1 to Dm.

The timing controller 11 receives vertical/horizontal synchronization signals V, H and a clock signal CLK, and generates control data for controlling operation timings of the data and gate drive circuits 12 and 13. Furthermore, the timing controller 11 compares an image of the current frame stored at a memory with an image of the next frame to generate a data voltage and and AC common voltage which update a data in accordance with the comparison result. To this end, the timing controller 11 includes a lookup table and a frame counter. Herein, the lookup table determines waveforms of the data voltage and the AC common voltage, and the frame counter counts the number of frame. A digital video data of 1 bit and a digital control data C1 of 1 bit are written at the lookup table. The digital video data is converted into a data voltage by the data drive circuit 12. Herein, the data voltage is changed into one of 2 number voltage levels. The digital control data C1 is converted into an AC common voltage by the common voltage generation circuit 15. Herein, the AC common voltage is changed into one of 2 number voltage levels. A reverse phase voltage of the current frame image is determined in accordance with the current state of each cell. Furthermore, a gray scale of the next frame image is realized in accordance with a correlation between the data voltage and the AC common voltage.

The common voltage generation circuit 15 generates the AC common voltage Vcom2 which swings between a high potential common voltage Vcom+ and a low potential common voltage Vcom− in response to the control data C1 from the timing controller 11. The common voltage generation circuit 15 supplies the AC common voltage Vcom2 to the common electrode 18. The AC common voltage Vcom2 has its potential inverted for each N frames, where N is an integer greater than or equal to 3. The AC common voltage Vcom2 can be changed in accordance with the frame and in accordance with the gray level of the current frame image and the next frame image.

Figure 5:
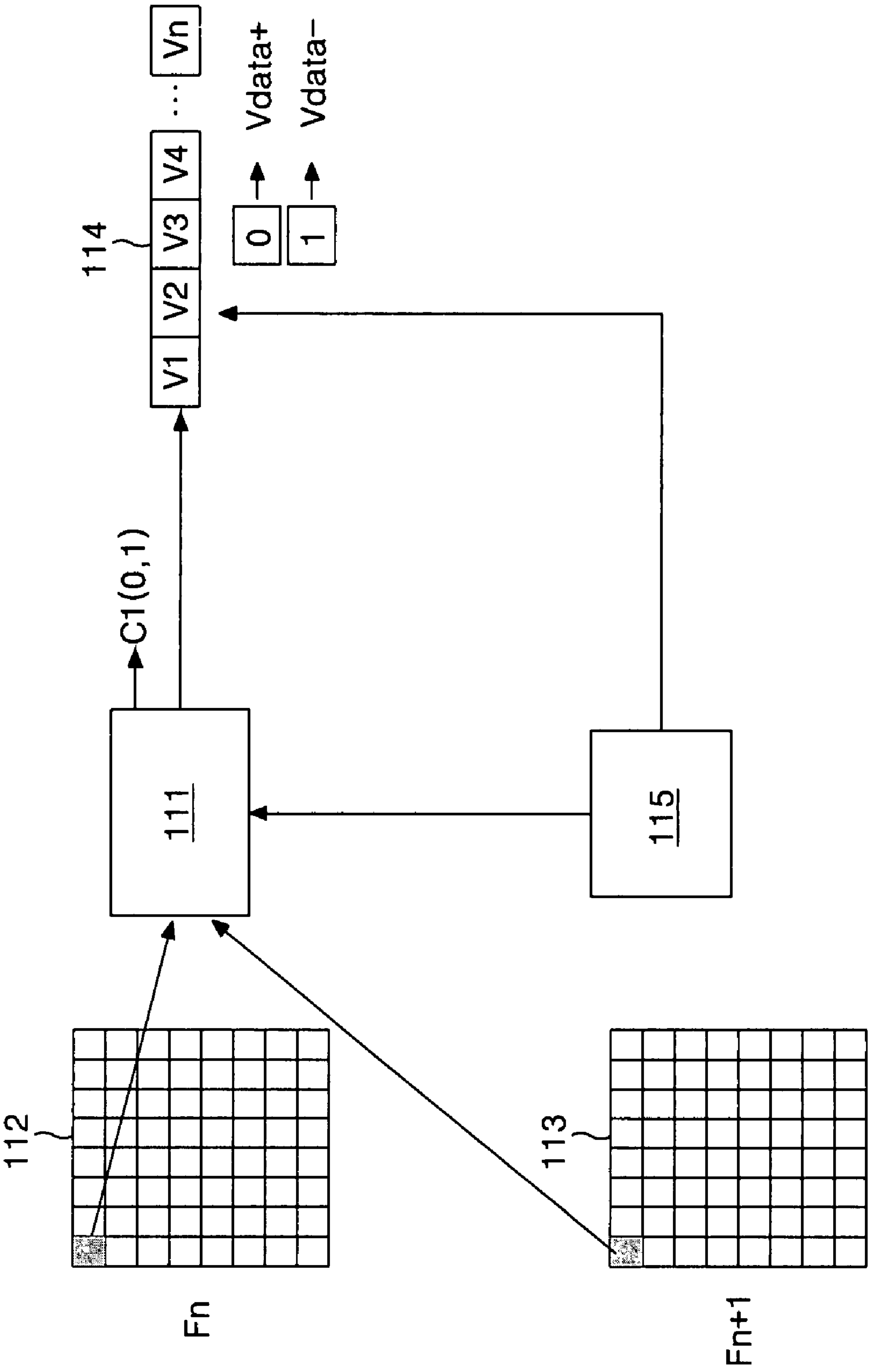
FIG. 5 shows a diagram of a circuit for generating a control data of an AC common voltage and a digital data in a timing controller shown in FIG. 3.

FIG. 5 shows a diagram of a circuit for generating a control data of an AC common voltage and a digital data in a timing controller shown in FIG. 3. Referring to FIG. 5, the timing controller 11 includes a first frame memory 112 to store an image of the current frame Fn; a second frame memory 113 to store an image of the next frame Fn+1 is stored; a lookup table 111 connected to the frame memories 112, 113; a frame counter 115 to count the number of frames; and a data memory 114 to store the digital data outputted from the lookup table 111. The data memory 114 is a latch included in the integrated circuit IC of the later-described data drive circuit 12.

The lookup table 111 has a plurality of lookup tables which register information on the drive waveform of the AC common voltage and the drive waveform of the data voltage supplied to each cell for a plurality of frame period in accordance with the image of the current frame Fn and the image of the next frame Fn+1 for each frame. The lookup table 111 compares the image of the current frame Fn with the image of the next frame by the unit of a cell for each fixed frames of which the number is indicated in accordance with the frame number information from the frame counter 115. The result of the comparison is a change of state, for example from W to LG, or from LG to DG.

The data waveform and common waveform to be applied to achieve the change of state is selected in lookup table 111. The amplitudes of the data and common waveforms are specified by using 1 bit per cell for vdata and 1 bit per cell for vcom. The waveform data in the lookup table 111 includes a reset data for initializing the state of the current cell, a stabilization data for stabilizing a bistable state within the cell, and an entry data for expressing a gray scale. Further, the lookup table 111 selects the control data C1 of 1 bit indicating the drive waveform of the pre-set AC common voltage Vcom2, and supplies the control data C1 to the common voltage generation circuit 15.

Figure 6:
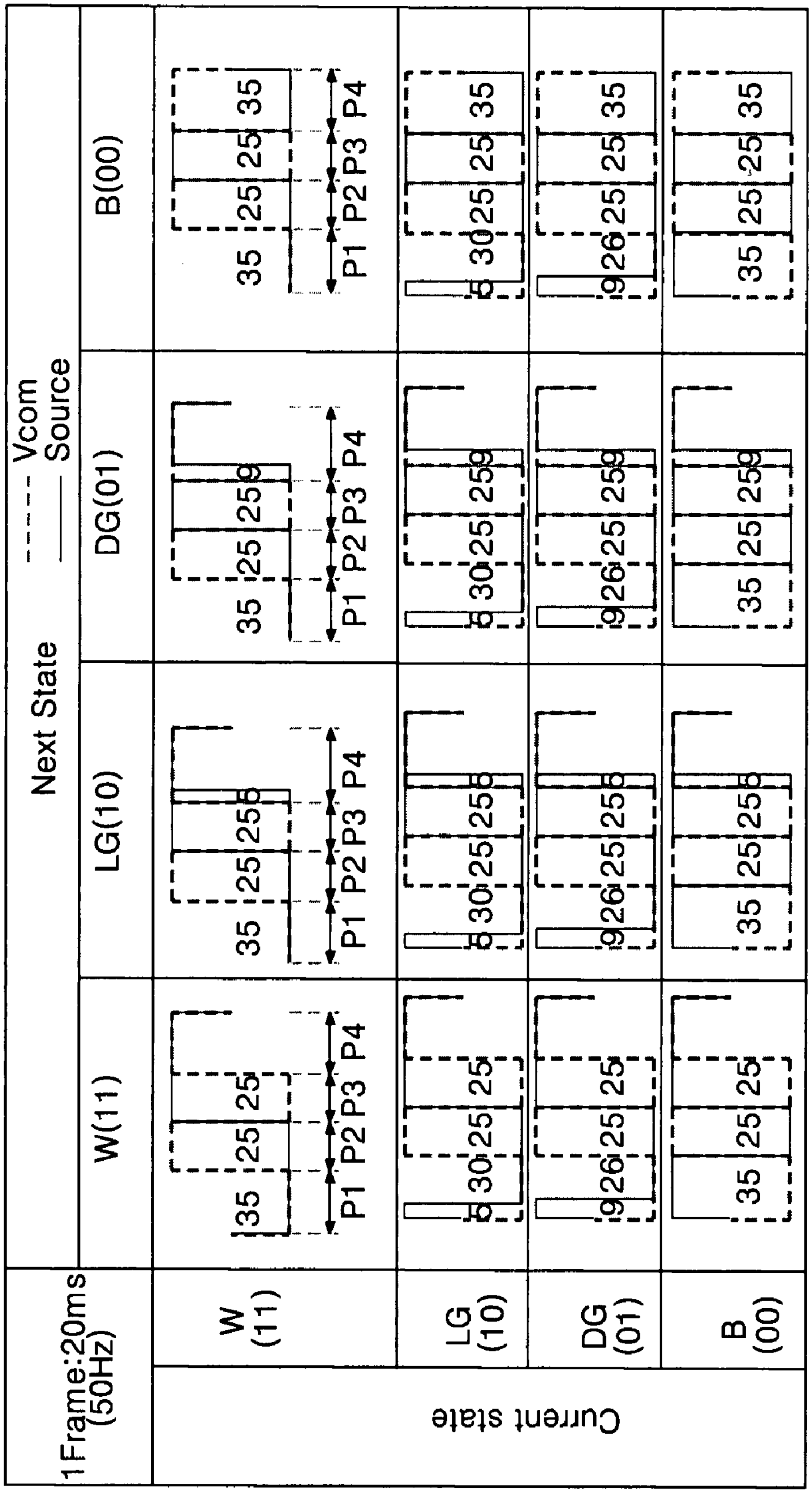
FIG. 6 shows exemplary common waveforms and data voltage waveforms in the lookup table shown in FIG. 5.

FIG. 6 shows exemplary common waveforms and data voltage waveforms in the lookup table shown in FIG. 5. Referring to FIG. 6, the lookup table 111 compares the current frame image with the next frame image for each gray level (W(11), LG(10), DG(01), B(00)), and stores the information on the AC common voltage drive waveform of a dotted line and the data voltage drive waveform of a solid line which are selected in accordance with the comparison result.

The drive waveform of the data voltage includes a drive waveform of the reset data generated for a reset period P1 of about 35 frame periods; a drive waveform of the first stabilization data generated for a first stabilization period P2 of about 25 frame periods; a drive waveform of the second stabilization data generated for a second stabilization period P3 of about 25 frame periods; and a drive waveform of the entry data generated for a data writing period P4 of about 35 frame periods.

The reset data supplies a white display voltage to the pixel electrode 17 of all the cells for the frame periods which are included in the reset period P1 in accordance with a state of the current frame image to primarily initialize a particle arrangement within a micro capsule 20 in all the targeted cells. The drive waveform of the reset data has the number of frames increased as the gray level of the current frame image is lower.

The first and second stabilization data alternately supply a white display voltage and a black display voltage for the first and second stabilization periods P2, P3, so as to separate the positively charged white particle 21 and the negatively charged black particle 22 within the micro capsule 20, thereby secondarily initializing the electrically charged particles within the micro capsule 20 to the bistable state. The first and second stabilization periods P2, P3 are the same regardless of the gray level difference between the current frame image and the next frame image.

The entry data supply a voltage which expresses one of four gray levels to the pixel electrode of the micro capsule 20 which is in the bistable state, thereby expressing the gray level. In the entry data, the number of frames to which the white display voltage is supplied increases as the gray level of the next frame image is higher, but the number of frames to which the black display voltage is supplied decreases as the gray level is lower. Thus, the electrophoretic display device according to an embodiment of the present invention expresses the gray level in accordance with the number of frames for which the data voltage is supplied within the data writing period P4 by the control of the pulse width modulation of the drive waveform. A white voltage is a high potential data voltage Vdata+, as in FIG. 7, when assuming that the white particles are positively charged, as in FIG. 4, and a black voltage is a low potential data voltage Vdata−, as in FIG. 7, when assuming that the white particles are positively charged, as in FIG. 4. If the white particle is negatively charged, the white voltage and the black voltage are to be made opposite to the above voltages. Thus, the data of the next frame image are entered by the unit of each cell for the frame periods, e.g., 128 frame periods, of the initialization, stabilization and data entry processes.

The AC common voltage Vcom2 is inverted after being maintained to the low common voltage Vcom− for the reset period P1, is inverted again after being maintained to the high potential common voltage Vcom+ for the first stabilization period P2, and then is maintained to the low potential common voltage Vcom− for the second stabilization period P3. And, the AC common voltage Vcom− is inverted between the second stabilization period P3 and the data writing period P4 and maintained to the high potential common voltage Vcom+ for the data writing period P4.

Figure 1:
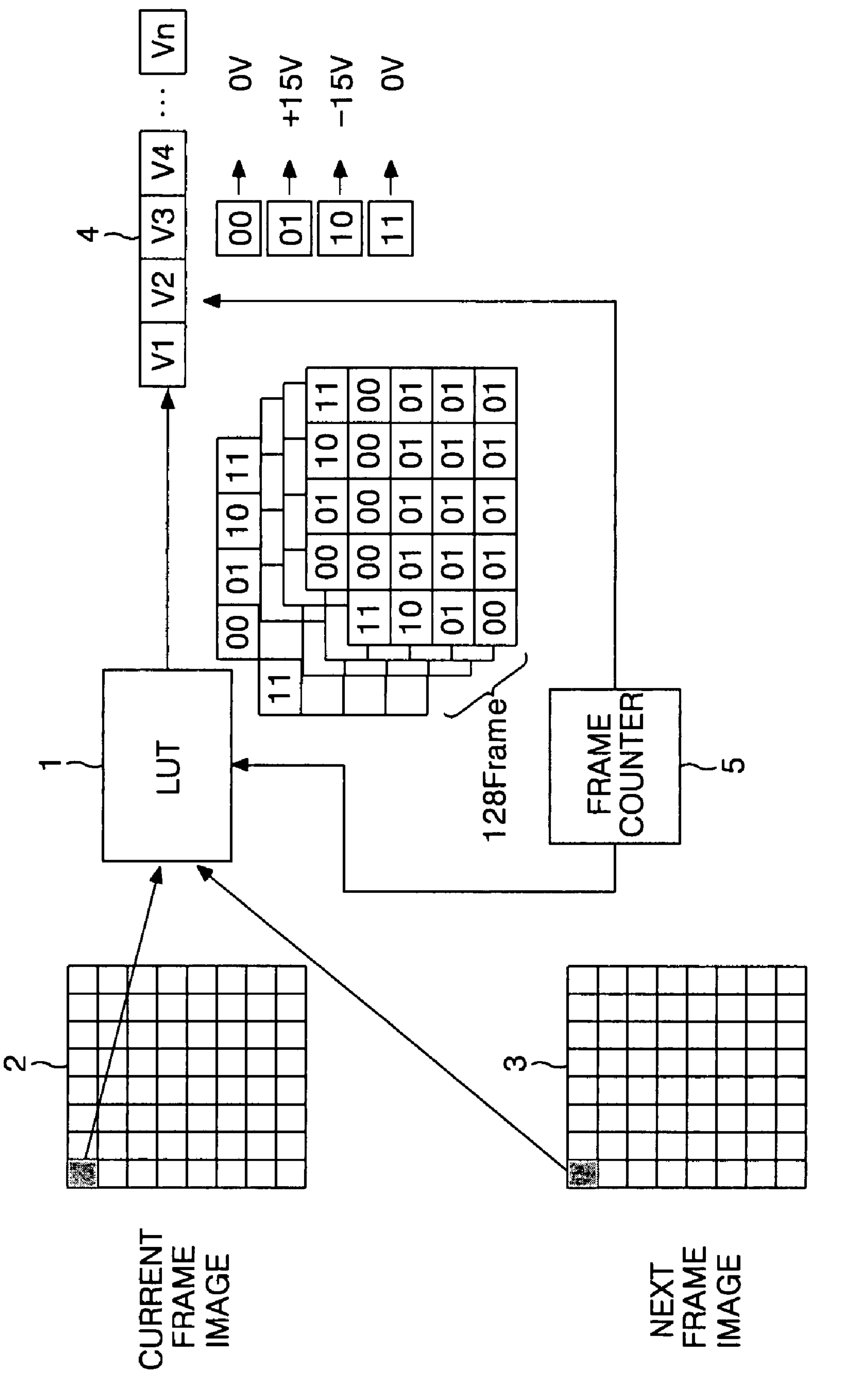
FIG. 1 RELATED ART
FIG. 1 shows a schematic diagram of a circuit for generating a data voltage waveform in an electrophoretic display device in accordance with the related art.
Figure 2:
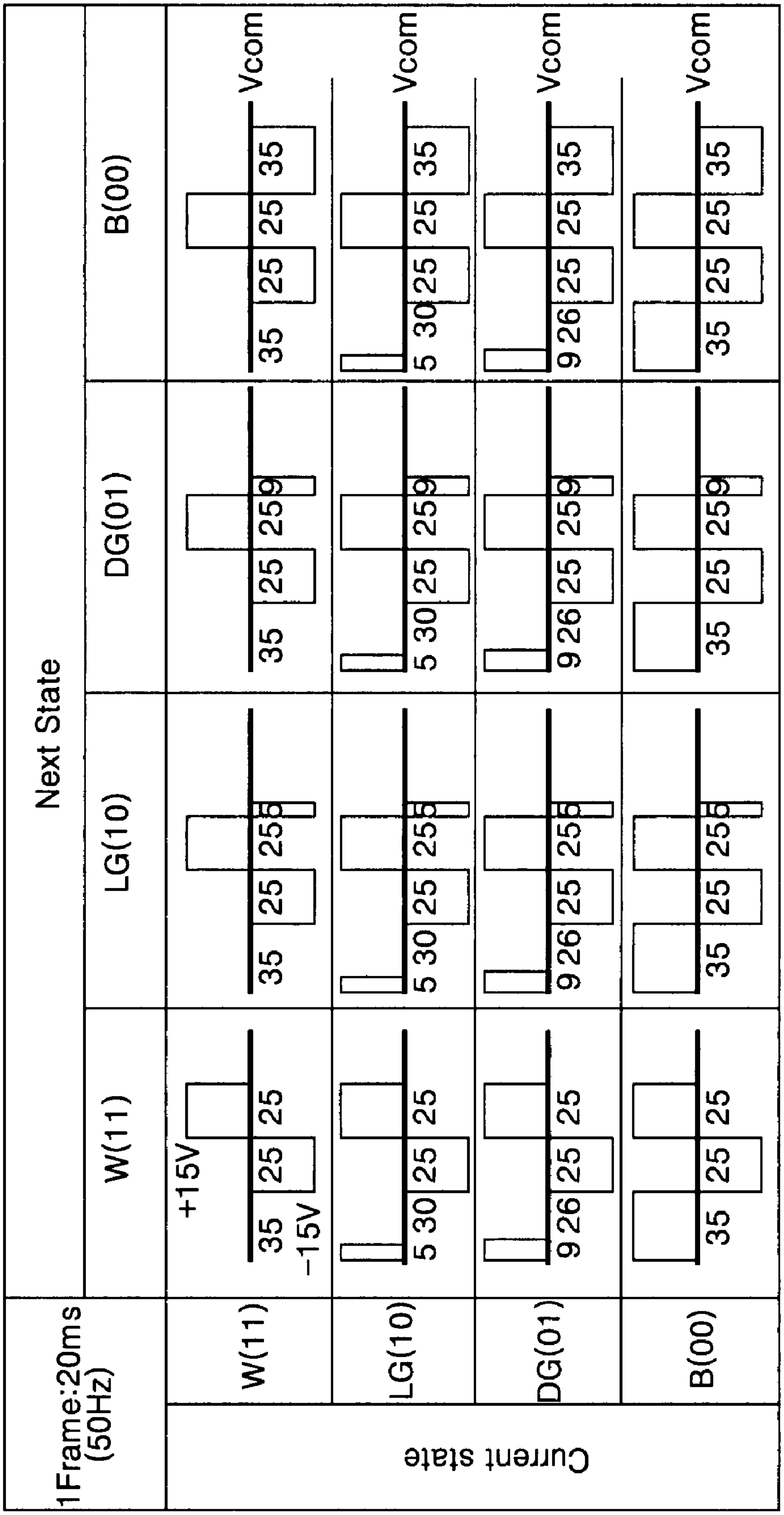
FIG. 2 RELATED ART
FIG. 2 shows data voltage waveforms in the lookup table shown in FIG. 1 in accordance with the related art.
Figure 7:
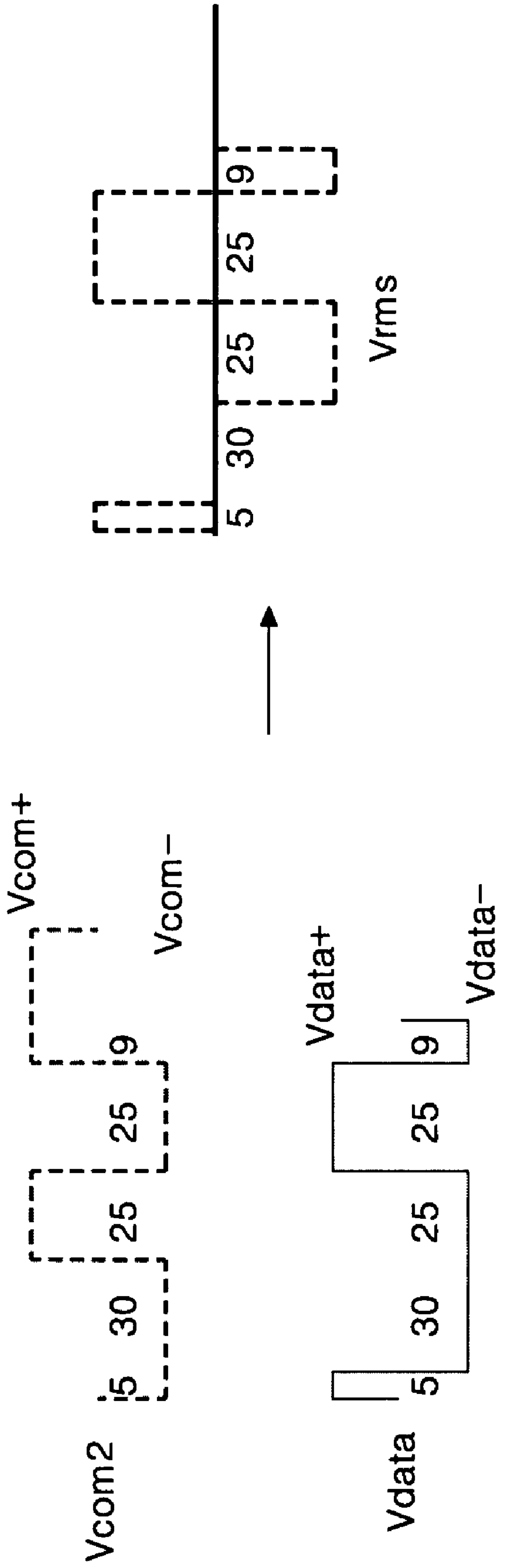
FIG. 7 shows an effective voltage corresponding to an exemplary AC data waveform and an AC common waveform according to an embodiment of the present invention.

FIG. 7 shows an effective voltage corresponding to an exemplary AC data waveform and an AC common waveform according to an embodiment of the present invention. Referring to FIG. 7, the data voltage swings between the high potential data voltage Vdata+ and the low potential data voltage Vdata−, and at the same time, the AC common voltage Vcom2 swings between the high potential common voltage Vcom+ and the low potential common voltage Vcom−. Accordingly, the effective voltage Vrms applied to the micro capsule 20 is |Vdata−Vcom|, thus the effective voltage Vrms is higher than the absolute value of the data voltage Vdata. The drive waveform of the effective voltage is higher in voltage and is substantially the same in shape as the data voltage drive waveform of FIG. 2 as it can be known in the comparison of the drive waveform of the data voltage selected by the DG gray level of the next state and the LG gray level of the current state in FIG. 2 and the drive waveform of the data voltage selected by the DG gray level of the next state of the LG gray level of the current state in FIG. 6, thus the initialization, stabilization and the data entry operations can be carried out normally.

Figure 8:
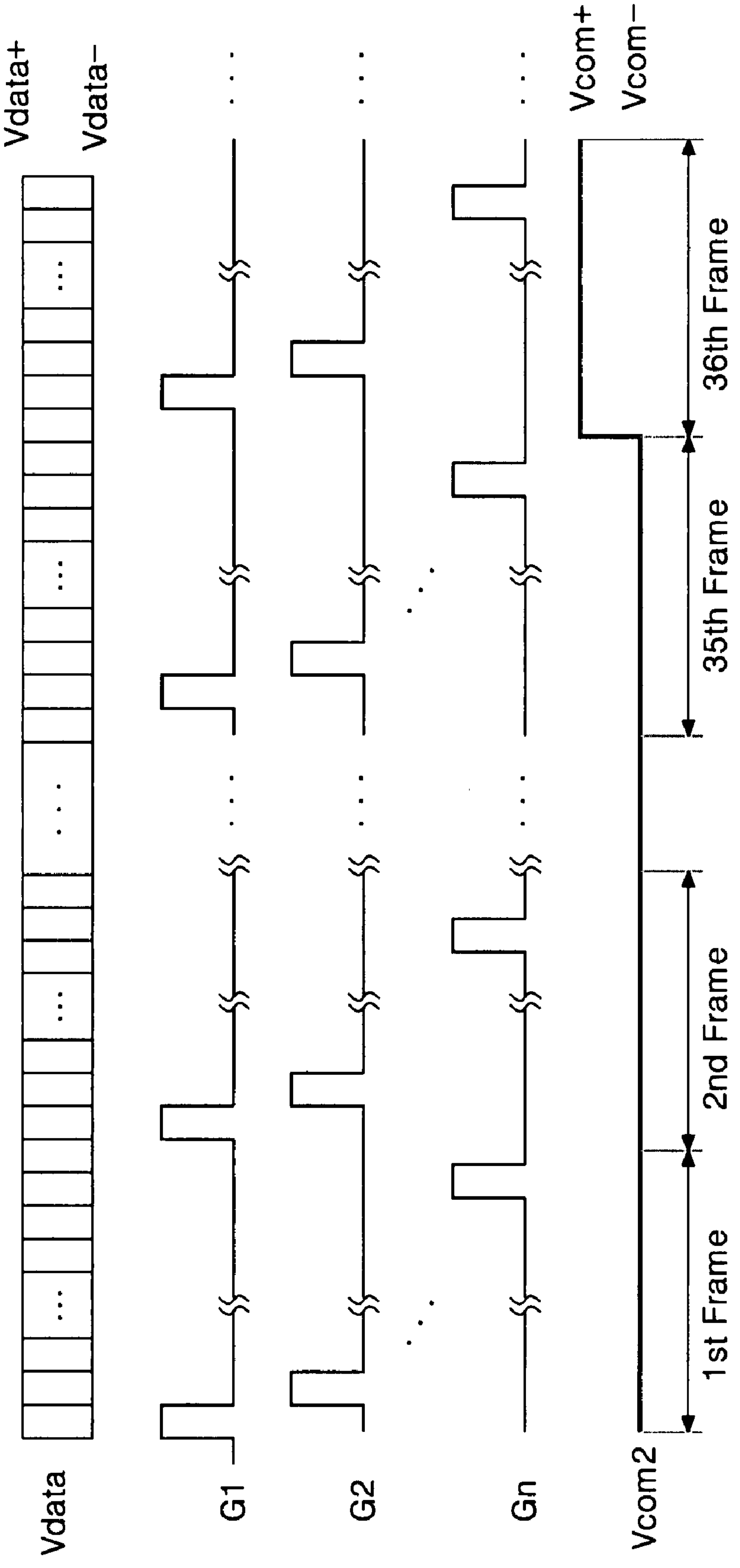
FIG. 8 shows an exemplary drive waveform applied to the display panel shown in FIG. 3.

FIG. 8 shows an exemplary drive waveform applied to the display panel shown in FIG. 3. Referring to FIG. 8, the data drive circuit 12 generates the data voltage Vdata synchronized with the scan pulse, and the data voltage Vdata swings between the high potential data voltage Vdata+ and the low potential data voltage Vdata−. The high potential data voltage Vdata+ and the low potential data voltage Vdata− can be determined to be about half the data voltage of the related art, e.g., +7.5V and −7.5, because the effective voltage Vrms applied to the micro capsule 20 increases by the AC common voltage Vcom2, as shown in FIG. 7.

The AC common voltage Vcom2 is simultaneously supplied to the common electrode 18, and swings between the high potential common voltage Vcom+ and the low potential common voltage Vcom− so as for the effected voltage Vrms applied to the micro capsule 20 to be high. The high potential common voltage Vcom+ can be determined to about 7V-8V, and the low potential common voltage Vcom− can be determined to about −7V to −8V.

Figure 9:
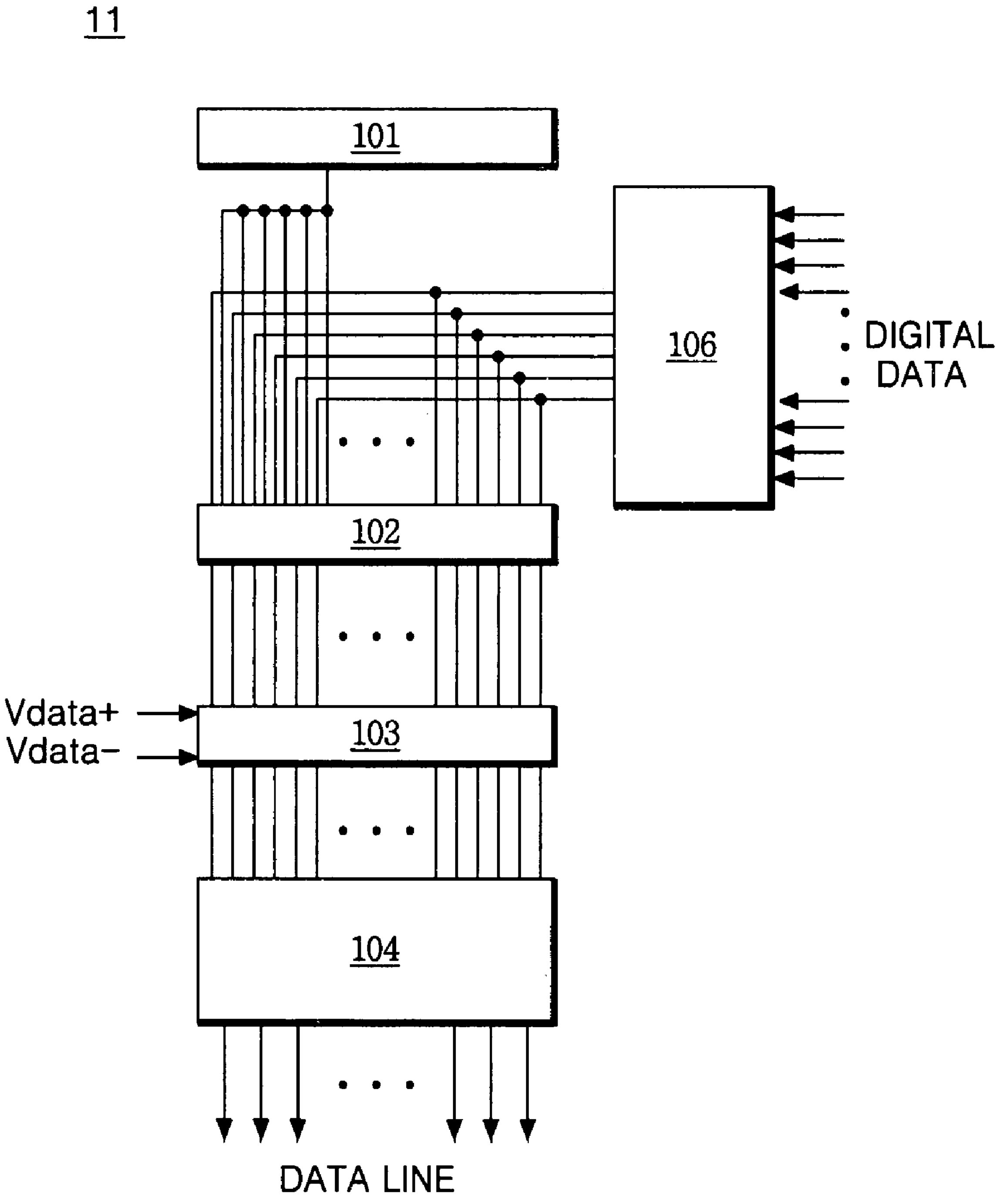
FIG. 9 shows a block diagram of an exemplary data drive for the circuit shown in FIG. 5.

FIG. 9 shows a block diagram of an exemplary data drive for the circuit shown in FIG. 5. Referring to FIG. 9, the data drive circuit 12 includes a plurality of data drive integrated circuits. Each of the integrated circuits includes a register 106 which receives a digital data of 1 bit from the timing controller 11; a shift register 101 which sequentially generates sampling signals; a latch 102 connected in cascade between the register 106 and the data line D1 to Dm; a digital to analog converter (hereinafter, referred to as "DAC") 103; and an output buffer 104.

The register 106 temporarily stores the digital data of 1 bit inputted in series from the timing controller 11, and supplies the digital data to the latch 102 in parallel. The shift register 101 shifts a source start pulse from the timing controller 11 in accordance with the source shift clock signal to generate the sampling signal. Further, the shift register 101 shifts the source start pulse to transmit a carry signal to the integrated circuit of the next stage.

The latch 102 sequentially samples the digital data of 1 bit in accordance with the sampling signal inputted from the shift register 101 to latch the sampled data, and then simultaneously supplies the latched digital data of 1 bit to the DAC 103. The output buffer 104 supplies to the data lines D1 to Dm the data voltage Vdata+ and Vdata− outputted from the DAC 103 without loss.

In accordance with an embodiment, the electrophoretic display device and the driving method thereof swings the data voltage between the high potential voltage and the low potential voltage in accordance with the drive waveform selected for the plurality of frame periods, and at the same time, inverts the potential of the common voltage for each N frames to decrease the data voltage, where N is an integer of greater than or equal to 3. And, the data voltage is generated to be a voltage of 2 states and the digital data of 1 bit is generated for generating the data voltage. Accordingly, the storage capacity is reduced and the data voltage decreases. Hence, the size of the data drive integrated circuit is also reduced, thereby reducing the cost of the circuit.

It will be apparent to those skilled in the art that various modifications and variations can be made in embodiments of the present invention. Thus, it is intended that embodiments of the present invention cover the modifications and variations of the embodiments described herein provided they come within the scope of the appended claims and their equivalents.

What is claimed is:

1. A display device, comprising:

an electrophoretic display panel including at least one cell with a micro capsule to display an image;

a data driver converting a digital data corresponding to the image into a data voltage;

a common voltage generator generating a AC common voltage which swings between a high potential common voltage and a low potential common voltage in response to a control data; and a controller supplying the digital data to the data driver and comparing an entire image of an entire current frame with an entire image of an entire next frame to generate a digital video data which controls a drive waveform of the data voltage in accordance with the comparison result and the control data which controls a drive waveform of the AC common voltage for updating of the digital data in accordance with the comparison result, wherein the AC common voltage is changed in accordance with the frame and in accordance with the gray level of the current frame image and the next frame image, wherein the drive waveform of the data voltage includes a reset voltage waveform which is generated for a reset period inclusive of a plurality of frame periods to initialize the micro capsule, a first stabilization voltage waveform for separating electrically charged particles within the micro capsule for a first stabilization period inclusive of a plurality of frame periods, following the reset period, a second stabilization voltage waveform for separating the electrically charged particles within the micro capsule in a direction opposite to the first stabilization period for a second stabilization period inclusive of a plurality of frame periods, following the first stabilization period and an entry data voltage waveform for expressing a gray level in the cell for a data writing period inclusive of a plurality of frame periods, following the second stabilization period, wherein the AC common voltage is inverted after being maintained to a low potential common voltage for the reset period, is inverted again after being maintained to a high potential common voltage for the first stabilization period, and then is maintained to the low potential common voltage for the second stabilization period, wherein the AC common voltage is inverted between the second stabilization period and the data writing period, and maintained to the high potential common voltage for the data writing period, wherein the reset voltage waveform supplies a white display voltage to a pixel electrode of all the cells for the frame periods which are included in the reset period in accordance with a state of the current frame image to primarily initialize a particle arrangement within the micro capsule, wherein the first and second stabilization voltage waveforms alternately supply a white display voltage and a black display voltage for the first and second stabilization periods to separate the positively charged white particle and the negatively charged black particle within the micro capsule to the bistable state, and wherein the first and second stabilization periods are the same, regardless of the gray level difference between the current frame image and the next frame image.

2. The display device of claim 1, wherein the controller includes:

a first frame memory to store the image of the current frame, a second frame memory to store the image of the next frame;

a lookup table to generate the digital video data and the control data in accordance with the comparison result;

a frame counter to count the number of frames; and a data memory to store the digital data corresponding to the digital video data outputted from the lookup table.

3. The display device of claim 2, wherein the lookup table has a plurality of lookup tables which register information on the drive waveform of the AC common voltage and the drive waveform of the data voltage supplied to each cell for a plurality of frame periods in accordance with the image of the current frame and the image of the next frame for each frame.

4. The display device of claim 3, wherein the lookup table compares the image of the current frame with the image of the next frame by the unit of the cell for each fixed frames of which a number is indicated in accordance with the frame number information from the frame counter and selects the digital video data of 1 bit for each cell in accordance with the comparison result.

5. The display device of claim 4, wherein the digital video data selected by the lookup table includes a reset data for initializing the state of the current cell, a stabilization data for stabilizing a bistable state within the cell, and an entry data for expressing a gray scale.

6. The display device of claim 4, wherein the lookup table selects the control data of 1 bit indicating the drive waveform of the pre-set AC common voltage.

7. The display device of claim 1, wherein the digital video data is converted into the data voltage changed into any one of 2 number voltage levels by the data driver.

8. The display device of claim 1, wherein the control data is converted into the AC common voltage changed into any one of 2 number voltage levels by the common voltage generator.

9. A method of driving at least one cell of an electrophoretic display panel having a plurality of cells with a micro capsule driven in accordance with a data voltage and an AC common voltage applied to a pixel electrode and a common electrode respectively, the method comprising:

storing a first data corresponding to an entire image of an entire current frame and a second data corresponding to an entire image of an entire next frame;

comparing the first data with the second data by the unit of the cell using a lookup table;

outputting a control data which controls a drive waveform of the AC common voltage for updating of a digital data corresponding to an image displayed at the electrophoretic display panel in accordance with the comparison result and a digital video data of 1 bit which controls a drive waveform of a data voltage corresponding to the digital data in accordance with the comparison result;

generating the AC common voltage which swings between a high potential common voltage and a low potential common voltage in response to the control data; and converting a digital data into the data voltage in response to the digital video data and supplying the data voltage to the pixel electrode, wherein the AC common voltage is changed in accordance with the frame and in accordance with the gray level of the current frame image and the next frame image, wherein the drive waveform of the data voltage includes a reset voltage waveform which is generated for a reset period inclusive of a plurality of frame periods to initialize the micro capsule, a first stabilization voltage waveform for separating electrically charged particles within the micro capsule for a first stabilization period inclusive of a plurality of frame periods, following the reset period, a second stabilization voltage waveform for separating the electrically charged particles within the micro capsule in a direction opposite to the first stabilization period for a second stabilization period inclusive of a plurality of frame periods, following the first stabilization period and an entry data voltage waveform for expressing a gray level in the cell for a data writing period inclusive of a plurality of frame periods, following the second stabilization period, wherein the AC common voltage is inverted after being maintained to a low potential common voltage for the reset period, is inverted again after being maintained to a high potential common voltage for the first stabilization period, and then is maintained to the low potential common voltage for the second stabilization period, wherein the AC common voltage is inverted between the second stabilization period and the data writing period, and maintained to the high potential common voltage for the data writing period, wherein the reset voltage waveform supplies a white display voltage to a pixel electrode of all the cells for the frame periods which are included in the reset period in accordance with a state of the current frame image to primarily initialize a particle arrangement within the micro capsule, wherein the first and second stabilization voltage waveforms alternately supply a white display voltage and a black display voltage for the first and second stabilization periods to separate the positively charged white particle and the negatively charged black particle within the micro capsule to the bistable state, and wherein the first and second stabilization periods are the same, regardless of the gray level difference between the current frame image and the next frame image.

10. The method of claim 9, wherein the digital video data outputted by the lookup table includes:

a reset data for initializing the state of the current cell;

a stabilization data for stabilizing a bistable state within the cell; and an entry data for expressing a gray scale.

11. The method of claim 9, wherein the digital video data is converted into the data voltage changed into any one of 2 number voltage levels.

12. The method of claim 9, wherein the control data is converted into the AC common voltage changed into any one of 2 number voltage levels

* * * * *